June 9, 1959

M. H. PARKS 2,889,795

STABILIZATION OF A FLOATING PLATFORM

Filed July 9, 1956

INVENTOR.
Mercer H. Parks,
BY
ATTORNEY.

United States Patent Office 2,889,795
Patented June 9, 1959

2,889,795

STABILIZATION OF A FLOATING PLATFORM

Mercer H. Parks, Houston, Tex., assignor, by mesne assignments, to Jersey Production Research Company, Tulsa, Okla., a corporation of Delaware Application July 9, 1956, Serial No. 596,623

6 Claims. (Cl. 114—.5)

The present invention is directed to stabilization of a floating marine structure. More particularly, the invention is concerned with a floating marine structure provided with a platform from which marine operations may be conducted. In its more specific aspects, the invention is concerned with a stabilized floating platform which maintains an even keel in rough water.

The present invention may be briefly described as a floating structure adapted for use in marine operations which comprises a plurality of interconnected floats open on their lower ends and closed on their upper ends. A platform subjected to unequal loading is supported on the upper ends of said floats. Means are connected to the floats for maintaining a selected and different pressure on each of said floats depending on the loading of said platform whereby a substantially equal upward thrust is exerted on the platform by the floats to provide stability to the structure.

The present invention is particularly directed to minimizing or eliminating movement of a floating structure due to a disturbed water surface. In other words, the present invention provides a structure or apparatus which will maintain an even keel in either still water or rough water. This is accomplished by providing in a floating structure having a platform subjected to unequal loading a plurality of interconnected floats, a pressure sensing device sensitive to and exposed to changes in pressure caused by wave action and a pressure distribution system connected to the floats. By providing means operably connecting the pressure sensing device and the pressure distribution system a selected and different pressure is maintained on each of said floats such that the structure is maintained at a level or on an even keel despite the agitated or rough water.

The present invention is, therefore, quite useful in marine operations such as well drilling operations for obtaining hydrocarbons, such as oil and gas, or other minerals, such as sulfur, from submarine locations, or in salvaging operations, and other marine operations requiring a stable base.

Figure 2:
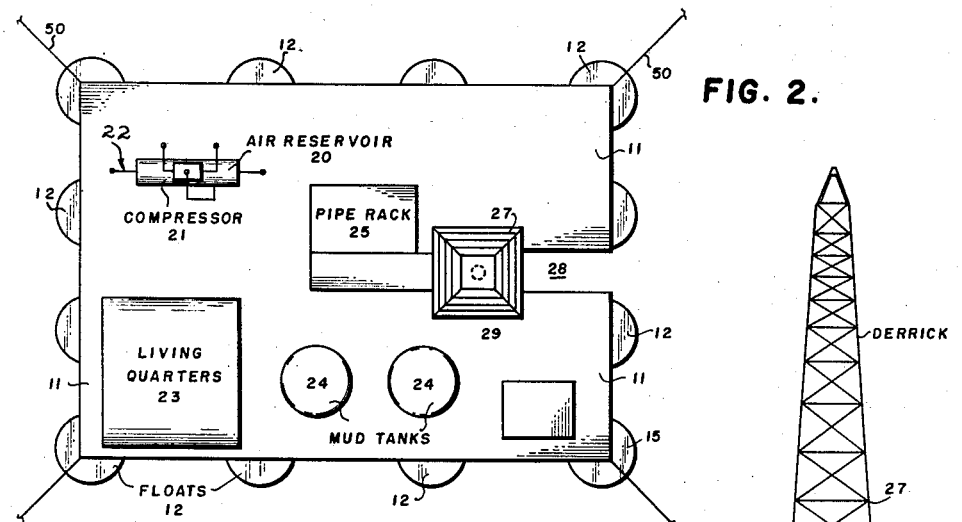
Figure 3:
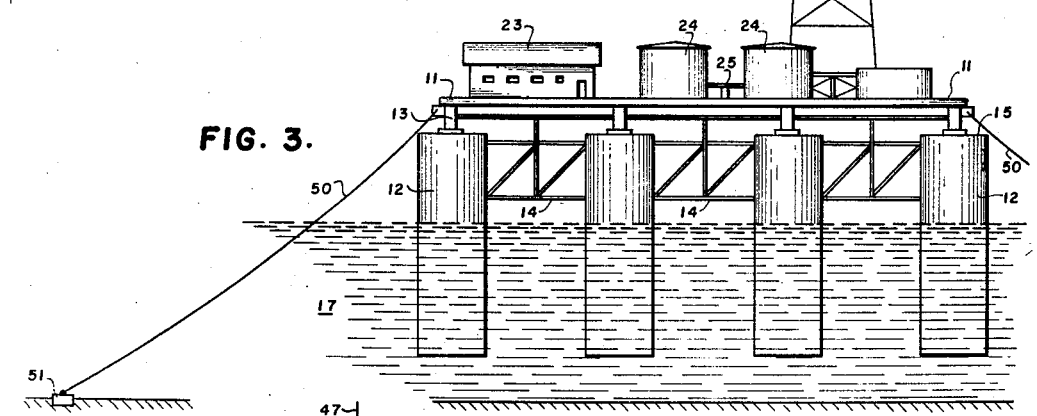
Figure 1:
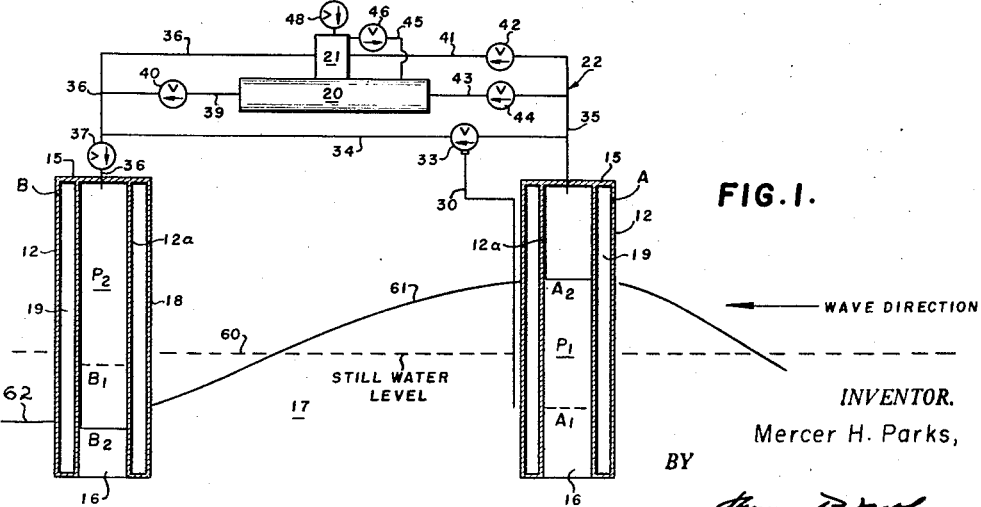

The present invention will be further illustrated by reference to the drawings in which:

Fig. 1 is a schematic showing of the principle of the device of the present invention and Figs. 2 and 3 are elevations of a floating structure employing the device of the present invention.

Referring now to the drawing in which identical numerals will be employed to designate identical parts, numeral 11 designates a platform which is supported by a plurality of floats 12 by means of supporting members 13 and cross-bracing or struts 14 which serve to interconnect the floats and platform and provide rigidity to the structure. The supporting members 13 are attached to the upper ends 15 of the floats 12.

The floats 12 have lower open ends 16 which are open to the water 17 and allowing entry of water into the floats 12. The floats 12 are provided with an inner wall 12a which defines, with the outer wall 18, annular chambers 19 which serve as buoyancy tanks to provide fixed buoyancy for the structure sufficient at maximum submergence to supply the minimum buoyancy to carry the load imposed by the platform.

Arranged on the platform 11 is an air reservoir or tank 20, an air compressor 21, and a suitable manifold arrangement designated generally by the numeral 22.

Also arranged on the platform 11 may be living quarters 23, mud tanks 24, pipe rack 25, and a derrick 27 including a well drilling drawworks arranged over the drilling slot 28, particularly where oil and gas wells are being drilled. As shown specifically in Fig. 2, a well bore 29 is being drilled from the platform 11 through the slot 28.

Fig. 1 is a simple schematic showing of the valving and piping connections between the floats 12 to allow pressure transfer from one to the other. For reasons of simplicity and to provide a clear example, only two floats A and B are shown connected into the manifold 22. Float A has connected into its top side a conduit 35 which accommodates air being forced up and out of float A. A conduit 36 containing a one way regulator valve 37 is connected into the top of float B to accommodate air being forced into float B. Conduits 35 and 36 are connected by conduit 34 containing a one-way pressure sensitive wave gauge valve 33. Conduit 36 connects into the outlet side of an air compressor 21 and also connects into the outlet side of an air reservoir 20 by way of conduit 39 containing one-way regulator valve 40. Conduit 35 from float A is connected to the inlet or suction side of compressor 21 by line 41 containing suction valve 42 and is also connected to the inlet side of reservoir 20 by line 43 containing one-way regulator valve 44. A line 45 provided with valve 46 connects the compressor 21 to reservoir 20 for discharging air into reservoir 20. Compressor 21 draws air from atmosphere by way of line 47 containing valve 48. Valve 37 and valve 33 are pressure sensitive regulator valves such as used in oil and gas separators.

The floating structure is provided with cables or lines 50 which extend to anchors 51. Each of the corners of the rectangular or polygonal structure are provided with such cables or lines 50 and anchors 51 to moor and anchor the structure and to provide lateral stability therefor.

When the surface of the water 17 is at still water level, as is indicated generally by the numeral 60, the unequal loading of the platform 11 may be compensated for to provide an even keel by maintaining a selected and usually different pressure in each of the floats 12 depending on the load distribution from the platform to each of floats 12. For example, the drilling derrick 27 and drawworks constitute a very heavy weight which would tend to cause a list in the structure which may be compensated for by exerting pressure on the floats 12 immediately in the area thereof and by releasing pressure from the floats 12 under the area of platform 11 not so heavily loaded. When the surface of the water 60 is disturbed by a wave action to form waves, such as 61, the structure may be maintained at an even keey by means of the arrangement shown. For example, in a structure having a plurality of floats open ended or largely unobstructed at the bottom, such as floats 12, the floats are designed to support a load, through structural connections as shown in the drawing, which is non-uniformly distributed. Thus the pressure in the floats varies from one to the other to support the load on an even keel in still water.

Referring again to Fig. 1 which shows only two of the floats 12 which are designated as A and B, the pressure inside float A at still water level is designated as $P_1$ with the water level inside the float designated as $A_1$. The pressure inside float B is designated as $P_2$ with the water level inside the float designated as $B_1$. The difference in water levels $A_1$ and $B_1$ is due to weight distribution on the structure 11. The pressure may be represented in one float by $P_1$ and in a second float by $P_2$ while the liquid levels may suitably be referred to by $A_1$ and $B_1$. When a disturbed water surface is encountered, such as by wave 61, the water level rises outside of some of the floats, as shown at A by the wave 61, and will become lower on the outside of some of the floats, as shown at B by the trough 62. A sensitive back pressure valve 33 in line 34 and controlled to maintain the predetermined maximum pressure $P_1$ in a specific float and which connects each float to every other float allows air to be forced from float A as the water surface rises outside of it; and the water surface $A_1$, for example, on the inside of the float rises approximately with the surface outside to some maximum position, such as $A_2$. The air so forced from the particular float may be directed through the lines illustrated by 34 into float B in which the level $B_1$ is seeking to fall as shown at $B_2$ and to reduce the pressure $P_2$ because of the depressed water level on the outside of the float B. The sensitive regulating valve 36, which is operably connected to maintain the predetermined pressure in float B at a minimum, allows air to be admitted into float B with falling water level in an amount sufficient to maintain the pressure $P_2$ which is the predetermined minimum as well as maximum for that float.

In the event that the air forced from the float A where the water level is rising is greater than that required to maintain pressure $P_2$ in the float B where the water level is falling, valve 44 in line 43 which is suitably set to open at a selected pressure allows air to enter reservoir 20 and the air is stored in reservoir 20 under pressure. If the pressure in reservoir 20 is higher than the pressure $P_1$, valve 44 remains closed and valve 42 in line 41 leading to compressor 21 opens at a selected pressure and the surplus air is compressed and discharged by way of line 45 controlled by valve 46 into reservoir 20.

If the amount of air released from the float A in which the water surface is rising, is insufficient to supply the volume required by the float B in which the water level is falling, valve 40 in line 39 opens and air previously stored in reservoir 20 is discharged into the floats in which the water is falling to maintain pressure $P_2$. If the volume of air available at pressure $P_2$ in reservoir 20 is inadequate or if the pressure in reservoir 20 is less than pressure $P_2$, the compressor 21 may draw air in from the atmosphere by the air intake line 47 controlled by valve 48 which compresses the air to fill the float B and maintain the pressure $P_2$.

All the above selection and operation of valves is effected by means of sensitive controls operated by the pressures present in the various parts of the system as described.

It will be thus seen from the foregoing example that by maintaining predetermined or selected pressures different from each other as illustrated by $P_1$ and $P_2$ and by nullifying the effects of external surges, such as caused by wave action, means are provided for minimizing or eliminating movement of a floating structure and thus maintaining an even keel despite the fact that an unequal load is maintained on the structure. It will be seen, therefore, that the present invention is of considerable utility and importance.

Although Fig. 1 illustrates only two floats such as A and B and the connections and valving between them only allows flow from float A to float B, it will be understood that in the actual hookup in a structure, such as shown in Figs. 2 and 3, that air must be able to flow in either direction. In other words in regard to Fig. 1, each float A and B would be connected in identical manner, float A would have an inlet line, such as 36, with its connections and float B would have an outlet line, such as 35, with its corresponding connections. All of the floats 12 would also be equipped with a wave gauge line such as 30 and valve 33.

The pressure distribution system of the entire structure is such that air pressure is forced from the floats where the water level is rising to the floats where the water level is receding.

The invention is particularly useful and advantageous in that air is discharged under pressure from one float to another either directly or by way of a storage vessel or compressor. The energy saved as compared to valving the air to the atmosphere and then compressing air as required is considerable.

The nature and objects of the present invention having been completely described and illustrated, what I wish to claim as new and useful and to secure by Letters Patent is:

1. A floating structure adapted for use in marine operations which comprises a plurality of floats open on their lower ends and closed on their upper ends, conduit means interconnecting said floats at the closed upper ends, a platform subjected to unequal loading supported on the upper ends of said floats, and pressure responsive valve means in said conduit means, means for supplying pressure individually to said floats to provide a selected and different pressure on each of said floats depending on the loading of said platform, said pressure responsive valve means maintaining the selected and different pressure on said floats whereby an upward thrust substantially equal to the loading is exerted on said platform by said floats to provide stability to said structure.

2. A floating structure in accordance with claim 1 in which the floats are provided with an annular buoyant chamber.

3. In a floating structure for use in marine operations, a plurality of interconnected floats open on their lower ends and closed on their upper ends, a platform subjected to unequal loading and supported by said floats on their upper ends, pressure sensing devices sensitive to and exposed to changes in pressures caused by wave action, an air distribution system connected to said floats, and means operably connecting said pressure sensing device and said air distribution system whereby an upward thrust substantially equal to the load imposed is exerted on said platform by said floats to provide stability for said structure by maintaining a selected and different pressure on each of said floats depending on the loading of said platform.

4. A floating structure in accordance with claim 3, in which the floats are cylindrical vessels provided with annular buoyant chambers in which the annular buoyancy chambers are adequate to supply the upward thrust specified when the floats are submerged to maximum depth in water.

5. In a floating structure for use in marine operations, a plurality of cylindrical floats for supporting the weight of the structure and open on their lower ends and closed on their upper ends, said floats being provided with an annular buoyant chamber, pressure sensing devices exposed to changes in pressures within said floats caused by wave action, and an air distribution system interconnecting said floats and including said pressure sensing devices, said pressure sensing devices being responsive to said changes in pressures to continuously distribute air to said floats to maintain a selected pressure on each float depending on the loading of said structure.

6. In a floating structure for use in marine operations, a plurality of floats for supporting the weight of the structure and open on their lower ends and closed on their upper ends, pressure sensing devices exposed to changes in pressures within said floats caused by wave action, and an air distribution system interconnecting said floats and including said pressure sensing devices, said pressure sensing devices being responsive to said changes in pressures to continuously distribute air to said floats to maintain a selected pressure on each float depending on the loading of said structure.

References Cited in the file of this patent

UNITED STATES PATENTS

| | | |
|---|---|---|
| 1,713,457 | Vaughan | May 14, 1929 |
| 1,718,006 | Reno | June 18, 1929 |
| 1,749,958 | Randell | Mar. 11, 1930 |
| 1,888,667 | Hort | Nov. 22, 1932 |
| 2,238,974 | Creed | Apr. 22, 1941 |
| 2,339,656 | Armstrong | May 7, 1946 |